United States Patent Office 3,440,074
Patented Apr. 22, 1969

3,440,074
PRODUCTION OF IMPROVED ROAD SURFACING BINDERS
Robert Stern, St.-Gratien, Val-d'Oise, France, and Thomas Ronald Welch, Ashford, and John Ashley Sage, Chertsey, England, assignors to The British Petroleum Company Limited, London, England, a company of England
No Drawing. Filed Mar. 3, 1965, Ser. No. 436,934
Claims priority, application Great Britain, Mar. 16, 1964, 10,919/64
Int. Cl. C08h 13/00
U.S. Cl. 106—279      16 Claims

ABSTRACT OF THE DISCLOSURE

Road surfacing binders are prepared from Middle East crudes by mixing a vacuum residue with an aromatic flux oil and blowing the mixture to grade. In the case of the crudes under consideratiton, i.e. Middle East crudes, improved temperature susceptibility, viscosity and wax content are achieved by using a vacuum residue having a cut point above 530° C., preferably 550–570° C.

---

This invention relates to the production of road surfacing binders from Middle East crude petroleums.

It is known to use vacuum residues derived from Middle East crude petroleums as road surfacing binders. These materials give satisfactory service but they usually have an undesirably high temperature susceptibility. Road surfaces which are required to carry heavy traffic may wear more rapidly when made from such binders than when made from binders having low temeprature susceptibility; this is particularly true where the road surfaces are subject to wide variation of temperature.

Furthermore road surfacing binders prepared from Middle East vacuum residues often have undesirably low viscosities at a given penetration. This means that the binders are more likely to flow away from the aggregate under high temperature conditions. This viscosity may be increased by decreasing the penetration but the specifications do not allow this since harder road surfacing binders are more likely to crack. In addition most specifications for road surfacing binders place an upper limit on the wax content and the binders derived from certain Middle East vacuum residues often have a wax concentration in excess of the maximum.

Thus it is usually desirable to improve the road surfacing properties of a Midle East vacuum residue by:

(1) Decreasing its temperature susceptibility,
(2) Increasing its viscosity, and
(3) Decreasing its wax content.

Since all three factors are important the best process is not necessarily the one which gives the maximum advantage in only one respect. For example a process which gives the lowest temperature susceptibility may be rejected in favour of another which gives a higher viscosity and/or a lower wax content. It is an object of this invention to produce improved road surfacing binders from Middle East crude petroleums.

According to the invention a road surfacing binder is prepared by blowing, at elevated temperature, as gas which contains free oxygen, e.g. air, through a blend of:

(a) 1–20, preferably 2–10, parts by weight of a vacuum residue which has a cut-point of at least 530° C. (760 mm.), preferably 550–570° C. (760 mm.) and is derived from a Middle East crude petroleum, and (b) 1 part-by-weight of an aromatic flux oil, whereby the penetration of the blend if reduced to a terminal value as hereinafter defined.

The cut point mentioned above is based upon a true boiling point, i.e. a boiling point determined with a large amount of reflux so that a very thorough separation is achieved. A commercial distillation column does not achieve as high a degree of separation as can be achieved in the laboratory and therefore a vacuum residue prepared in a commercial distillation column usually contains a small quantity of material boiling below the cut point which represents the efficiency of the column. These commercially prepared residues are suitable for use in preparing road surfacing binder according to the invention.

The distillation (both commercial production and laboratory test) of these highly involatile materials is always carried out under reduced pressure. Since boiling points depend upon pressure it is usual to convert all boiling points to a theoretical equivalent measured at atmospheric pressure. In this specification boiling points which have been so converted are indicated by the code (760 mm.).

The process according to the invention comprises "blowing" a blend of vacuum residue and aromatic flux oil. "Blowing" is well-known in the petroleum industry and any well-known process, with or without a catalyst, may be utilised. During the blowing process the bitumen becomes harder, i.e. the penetration decreases. Most commercial processes are "continuous"; that is a continuous supply of feedstock and air are passed into a blower at elevated temperature and a continuous supply of product is removed. The penetration of the product is controlled by adjusting the relative quantities of air and feedstock and, since this adjustment is highly characteristic of each individual piece of apparatus, the process is controlled on a trial-and-error basis by measuring the penetration figure; for purposes fo this specification this figure is called "terminal value".

Normally the terminal value of the penetration will be that given in the specification laid down by the purchaser of the road surfacing material. However on occasions it may be desired to produce blending stocks and therefore other terminal values may be specified. The terminal value will usually be in the range 10–350 mm./10 at 25° C.

It is known to carry out the blowing process over a wide range of temperatures and the whole of this range may be utilised in carrying out a process according to the invention. However the temperatures are almost always within the range 200–350° C., and usually within the range 225–290° C.

The treatment of crude petroleum usually comprises degassing at the well head followed by distillation under atmospheric pressure at a refinery. The residue from the atmospheric distillation is usually further distilled under reduced pressure and the residue left after this distillation is called a vacuum residue. The term "short vacuum residue" is often used to denote a vacuum residue with a relatively high cut point; conversely the term "long vacuum residue" is used to denote a vacuum residue with a relatively low cut point. Short vacuum residues thus comprise a smaller proportion of the original crude although the difference between a short vacuum residue and a long vacuum residue is usually less than 10% by weight of the original crude.

The inventors have discovered that good road surfacing binders can be made from Middle East crude petroleums by blowing a mixture of vacuum residues and aromatic flux oil. The correct choice of the vacuum residue is an important feature in carrying out this process. In the normal operation of a distillation column the cut point of the residue is determined by the requirements of the least volatile distillate fraction; for example the nature of the vacuum residue may be determined by the lubricating oils which have to be produced from the crude. The inventors have now found that, in most cases, the vacuum residue obtained by consideration of the lubricating oil requirements is too long to give optimum results in a process according to this invention. In these cases better results are obtained by using a shorter vacuum residue whose cut-point is determined by the requirements of the road surfacing binder.

It has already been pointed out that a commercially prepared vacuum residue usually contains material boiling below the cut point. For this reason it is common to avoid the specification of cut-points and to specify instead the penetration of the vacuum residue; this procedure is analogous to that described in relation to the blowing process.

A process according to our invention can be specified in these terms but each of the different Middle East crude petroleums requires a different penetration range in order to give an improved road surfacing binder. Particularly suitable penetration ranges (at 25° C.) for the vacuum residues for use in a process according to this invention are those shown in the following table:

|  | Mm./10 |
|---|---|
| Agha Jari crude | 20–250, preferably 40–180 |
| Gach Saran crude | 20–250, preferably 40–110 |
| Kuwait crude | 20–350, preferably 150–250 |
| Kirkuk crude | 20–350, preferably 100–200 |

The aromatic flux oils most suitable for use in compositions according to the invention are those known in the petroleum industry as the "aromatic extracts." These are the predominantly aromatic fractions produced by treating vacuum distillates and de-asphalted vacuum residues with solvents selective for the aromatic components. The solvents commonly used in the petroleum industry include furfural, sulphur-dioxide and phenol. Aromatic extracts obtained as described above from heavy oils produced by catalytic cracking of petroleum vacuum distillates are also suitable for use in processes according to the invention.

All the aromatic extracts produced from various fractions of atmospheric residues by the petroleum industry are suitable for use in processes according to the invention although there may be a few examples of exceptional volatility which would give rise to a fire hazard during the blowing operation and clearly the use of such materials should be avoided. The aromatic extracts (having viscosities of 20–200 cs. at 210° F.) obtained during the production of lubricating oils are particularly suitable.

Aromatic extracts derived from crude petroleums other than Middle East crude petroleums are suitable for use according to the invention. Thus a refinery which processes Middle East and other crudes may wish to use aromatic extracts derived from a variety of crudes but a refinery which only processes Middle East crudes will clearly wish to derive both feedstocks from Middle East crudes.

Several examples of the preparation of road surfacing binders from Middle East crude petroleums will now be described. The blowing process was carried out, in each case, in a small scale plant. The temperatures, reaction times, and the like specified above may need modification when using full scale commercial equipment for even other pilot plants. In all cases the aromatic flux oil was an aromatic extract obtained during the conventional de-aromatisation of lubricating oils. Information about the individual aromatic extracts is given in Table I which shows the crude source, the solvents used for the de-aromatisation, inspection data on the aromatic extracts and inspection data on the lubricating oil which was the product of the de-aromatisation.

TABLE I

| Identification Code | AR1 | AR2 | AR3 |
|---|---|---|---|
| Crude Source | Iraq | Agha Jari | Kuwait. |
| Solvent | Furfural | Furfural | Furfural. |
| Extract Data: | | | |
| Viscosity at 100° F | 1,951 cs | | 948 cs. |
| Viscosity at 140° F | 268.4 cs | 509 cs | 175 cs. |
| Viscosity at 210° F | 31.74 cs | 61 cs | 25.7 cs. |
| Specific Gravity (60° F./60° F.) | 1.0185 | 0.9650 | 0.995. |
| Lubricant Data: | | | |
| Viscosity at 140° F | 38.9 cs | 151 cs | 40.0 cs. |
| V.I. | 95 | 95 | 95. |

The vacuum residues used in the examples are specified in Table II which gives the crude source, cut point and inspection data in each case.

TABLE II

| Crude Source | Agha-Jari | | | Gach Saran | | Kuwait | Kirkuk | |
|---|---|---|---|---|---|---|---|---|
| Identification Code | VR1 | VR2 | VR5 | VR3 | VR6 | VR4 | VR7 | VR8 |
| Cut Point, ° C | 528 | 570 | 550 | 534 | 540 | 570 | 536 | 550 |
| Residue Type | Long | Short | Short | Short | Short | Short | Short | Short |
| Penetration at 25° C | 293 | 67 | 135 | 106 | 63 | 210 | 180 | 105 |
| Penetration at 10° C | 38 | 11 | 16 | 15 | 9 | 31 | | 14 |
| Penetration Ratio | 7.7 | 6.1 | 8.4 | 7.1 | 7.0 | 6.8 | | 7.5 |
| Softening Point, ° C | 38 | 50 | 45 | 46 | 49.5 | 37 | | 47 |
| Fraass Breaking Pt., ° C | −19 | −14 | | −16 | −8 | −18 | | |
| K.V. at 210° F., cs | 790 | 3,310 | 1,600 | 1,740 | 3,220 | 1,800 | | 2,740 |
| Asphaltenes (IP143) percent | 4.2 | 7.6 | | 7.3 | 7.7 | 5.3 | | 7.5 |
| Wax (DIN 1995) percent | 2.3 | 1.6 | | 2.0 | 2.2 | 1.5 | | 1.8 |

Example I.—Vacuum residues from Agha Jari crude

This example compares a road surfacing binder produced from VR1 with two produced from VR2. VR1 is a "long" vacuum residue whose cut-point was determined, according to normal refinery practice, by the lubricating oil requirements. VR2 is a "short" vacuum residue whose cut-point was determined by the requirements of the binder.

Four road surfacing binders, hereinafter identified as RSB 1, RSB 2, RSB 3 and RSB 8, were produced by air blowing the following blends:

|  | Percent wt. |
|---|---|
| RSB 1 | 75 VR1+25 AR1 |
| RSB 2 | 75 VR2+25 AR1 |
| RSB 3 | 75 VR2+25 AR2 |
| RSB 8 | 75 VR5+25 AR1 |

All the blends were air-blown at 235° C. in a continuous blower which gave about 75% oxygen utilisation with a residence time of about 4 hours. The following relative air/feedstock feed rates were used:

|  | Standard cubic metres of air per metric ton [1] of blend |
|---|---|
| RSB 1 | 110 |
| RSB 2 | 75 |
| RSB 3 | 76 |
| RSB 8 | 87 |

[1] 1 metric ton = $10^6$ g.

The properties of the four products are given in Table II.

TABLE III

| Identification code | RSB 1 | RSB 2 | RSB 3 | RSB 8 |
|---|---|---|---|---|
| Residue type | Long | Short | Short | Short |
| Penetration at 25° C | 91 | 76 | 80 | 74 |
| Penetration at 10° C | 22 | 15 | 20 | 14 |
| Penetration Ratio | 4.1 | 5.1 | 4.0 | 5.3 |
| Softening Point, °C | 48 | 50.5 | 50.5 | 49.5 |
| Fraass, °C | −22 | −17 | −18 | |
| K.V. at 210° F., cs | 2,160 | 3,520 | 3,900 | 3,010 |
| Asphaltenes, wt. percent | 13.3 | 15.7 | 13.8 | |
| Wax, wt. percent | 2.2 | 1.4 | 1.7 | 1.7 |

RSB 2, RSB 3 and RSB 4 have a higher kinematic viscosity and a lower wax content than the comparative material RSB 1. All four of the blown road surfacing binders have better temperature susceptibility than the original vacuum residues.

Example 2.—Vacuum residues from Gach Saran crude

Three road surfacing binders, hereinafter identified as RSB 4, RSB 5, and RSB 9 were produced by blowing the following blends of VR3:

| | Percent wt. |
|---|---|
| RSB 4 | 75 VR3+25 AR1 |
| RSB 5 | 60 VR3+40 AR1 |
| RSB 9 | 75 VR3+25 AR1 |

In all three cases the blends were air-blown at 235° C. in a continuous blower which gave about 80% oxygen utilisation with a residence time of about 4 hours. The following air/feedstock feed rates were used:

| | Standard cubic metres of air per metric ton of blend |
|---|---|
| RSB 4 | 78 |
| RSB 5 | 130 |
| RSB 9 | 55 |

The properties of the three products are given in Table IV.

TABLE IV

| Identification code | RSB 4 | RSB 5 | RSB 9 |
|---|---|---|---|
| Residue type | Short | Short | Short |
| Penetration at 25° C | 81 | 87 | 73 |
| Penetration at 10° C | 18 | 23 | 15 |
| Penetration Ratio | 4.5 | 3.8 | 4.8 |
| Softening Point, °C | 48 | 50 | 49 |
| Fraass, °C | −16 | −25 | −14 |
| K.V. at 210° F., cs | 2,740 | 3,194 | 3,350 |
| Asphaltenes, wt. percent | 14.7 | 16.6 | 14.2 |
| Wax, wt. percent | 1.7 | 1.6 | 1.7 |

RSB 4, RSB 5 and RSB 9 are all satisfactory road surfacing binders. However RSB 4 would be improved by a higher viscosity at 210° F. This has been achieved in the case of RSB 5 but at the expense of using a high proportion of AR1 and in the case of RSB 9 an even higher viscosity has been achieved by using an even shorter vacuum residue. The results given above suggest using Gach-Saran vacuum residue having a cut-point above 534° C.

Example 3.—Vacuum residues from Kuwait crude

Two road surfacing binders, hereinafter identified as RSB 6 and RSB 7, were both produced by blowing the following blend of VR4:

80% wt. VR4+20% wt. AR3

In both cases the blends were air-blown at 250° C. in a continuous blower which gave about 90% oxygen utilisation with a residence time of about 2 hours in the case of RSB 6 and about 70% oxygen utilisation with a residence time of about 3½ hours in the case of RSB 7.

The following air/feedstock feed rates were used.

| | Standard cubic metres of air per metric ton of blend |
|---|---|
| RSB 6 | 60 |
| RSB 7 | 100 |

The properties of the two products are given in Table V.

TABLE V

| Identification code | RSB 6 | RSB 7 |
|---|---|---|
| Residue type | Short | Short |
| Penetration at 25° C | 195 | 83 |
| Penetration at 10° C | 32 | 18 |
| Penetration Ratio | 6.09 | 4.6 |
| Softening Point, °C | 40.2 | 49 |
| Fraass, °C | −20 | −18 |
| K.V. at 210° F | 1,800 | 4,200 |
| Asphaltenes, wt. percent | 9.90 | 14.1 |
| Wax, wt. percent | 1.2 | 1.1 |

Example 3.—Vacuum residues from Kirkuk crude

Two road surfacing binders, hereinafter identified as RSB 10 and RSB 11, were both produced by air blowing the following blends of VR7 and VR8:

| | Percent wt. |
|---|---|
| RSB 10 | 80 VR7+20 AR1 |
| RSB 11 | 70 VR8+30 AR1 |

In both cases the blends were batch blown; for 9 hours at 230° C. in the case of RSB 10 and for 18 hours at 300° C. in the case of RSB 11.

The properties of the two products are given in Table VI.

TABLE VI

| Identification code | RSB 10 | RSB 11 |
|---|---|---|
| Residue type | Short | Short |
| Penetration at 25° C | 85 | 81 |
| Penetration at 10° C | 19 | 16 |
| Penetration Ratio | 4.5 | 5.0 |
| Softening Point, °C | 48 | 47 |
| Fraass, °C | −17 | |
| K.V. at 210° F., cs | 3,440 | 3,790 |
| Asphaltenes, wt. | 15.5 | 14.4 |
| Wax, wt. percent | 1.7 | 1.2 |

We claim:

1. A method of obtaining a road surfacing binder having improved temperature susceptibility, satisfactory viscosity and desired wax content made by blowing a gas containing free oxygen, at a temperature in the range of 200–350° C., through a blend of 1–20 parts of a vacuum residue derived from a Middle East crude petroleum and 1 part by weight of an aromatic flux oil, whereby the penetration of the blend is reduced to a value in the range 10–350 mm./10 at 25° C., the improvement which comprises using as the vacuum residue one which has a cut point of at least 530° C. (760 mm.)

2. A method according to claim 1, in which the gas which contains free oxygen is air.

3. A method according to claim 1, in which the blowing is carried out at 225–290° C.

4. A method according to claim 1, in which the aromatic flux oil is aromatic extract.

5. A method according to claim 4, in which the aromatic extract is derived from a Middle East crude petroleum.

6. A method according to claim 1, in which the blend contains 2–10 parts by weight of the vacuum residue and one part by weight of the aromatic flux oil.

7. A method according to claim 1, in which the cut point of the vacuum residue is at least 550° C.

8. A method according to claim 1, in which the cut point of the vacuum residue is at the most 570° C.

9. A method according to claim 1, in which the vacuum residue has a penetration of 20–250 mm./10 at 25° C. and is derived from Agha-Jari crude petroleum.

10. A method according to claim 9, in which the penetration is 40–180 mm./10 at 25° C.

11. A method according to claim 1, in which the vacuum residue has a penetration of 20–250 mm./10 at 25° C. and it is derived from a Gach Saran crude petroleum.

12. A method according to claim 11, in which the penetration is 40–110 mm./10 at 25° C.

13. A method according to claim 1, in which the vacuum residue has a penetration of 20–350 mm./10 at 25° C. and is derived from Kuwait crude petroleum.

14. A method according to claim 13, in which the penetration is 150–250 mm./10 at 25° C.

15. A method according to claim 1, in which the vacuum residue is derived from Kirkuk crude petroleum.

16. A method according to claim 15, in which the penetration is 100–200 mm./10 at 25° C.

References Cited

UNITED STATES PATENTS

| | | | |
|---|---|---|---|
| 3,350,295 | 10/1967 | Hamner et al. | 106—285 XR |
| 3,360,455 | 12/1967 | Corbett et al. | 106—274 XR |
| 3,392,104 | 7/1968 | Potts et al. | 106—273 XR |
| 2,343,789 | 3/1944 | Morris | 208—6 |
| 2,395,996 | 3/1946 | Doyle. | |

JULIUS FROME, *Primary Examiner.*

J. B. EVANS, *Assistant Examiner.*

U.S. Cl. X.R.

94—20, 23; 208—6, 23, 44; 106—273